United States Patent
Marte et al.

(10) Patent No.: US 10,064,249 B2
(45) Date of Patent: Aug. 28, 2018

(54) CONVERTER FOR LIGHT SOURCES

(71) Applicant: TRIDONIC GMBH & CO KG, Dornbirn (AT)

(72) Inventors: Patrick Marte, Götzis (AT); Frank Lochmann, Esseratsweiler (DE)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 15/537,930

(22) PCT Filed: Apr. 13, 2016

(86) PCT No.: PCT/AT2016/050093
§ 371 (c)(1),
(2) Date: Jun. 20, 2017

(87) PCT Pub. No.: WO2016/164949
PCT Pub. Date: Oct. 20, 2016

(65) Prior Publication Data
US 2018/0027621 A1    Jan. 25, 2018

(30) Foreign Application Priority Data

Apr. 17, 2015 (DE) .................. 10 2015 206 982
Jul. 7, 2015 (AT) .................. GM201/2015

(51) Int. Cl.
*H05B 33/00* (2006.01)
*H05B 33/08* (2006.01)

(52) U.S. Cl.
CPC ..... *H05B 33/0815* (2013.01); *H05B 33/0821* (2013.01)

(58) Field of Classification Search
CPC .. H02J 50/12; H02J 7/025; H02J 50/60; H02J 5/005; H02J 50/80; H02J 50/90;
(Continued)

(56) References Cited

U.S. PATENT DOCUMENTS

2002/0186026 A1  12/2002 Elferich
2014/0375229 A1  12/2014 Gruber et al.
(Continued)

FOREIGN PATENT DOCUMENTS

DE  10 2012 224 200   6/2014
DE  10 2013 106 425   12/2014
(Continued)

OTHER PUBLICATIONS

German search report in priority German application 10 2015 206 982.6 dated Dec. 8, 2015.
(Continued)

*Primary Examiner* — Monica C King
(74) *Attorney, Agent, or Firm* — Andrus Intellectual Property Law

(57) ABSTRACT

The invention relates to a converter for light sources, comprising an LLC resonant circuit, from the secondary side of which light sources, e.g. an LED path, can be energized; the LLC resonant circuit includes a half-bridge circuit with two series-connected switches that are triggered by a control circuit, and further includes a resonant circuit that is energized from a central point between the two switches, as well as a transformer which is supplied with AC voltage from an output of the resonant circuit and on the secondary side of which two separate current paths for the two polarities of the AC voltage are provided; a detection circuit is provided which detects a signal representing currents in the two current paths and/or the ratio between the two currents, and the control circuit adjusts the timing of the two switches of the half-bridge circuit in accordance with the signal detected by the detection circuit.

11 Claims, 3 Drawing Sheets

(58) Field of Classification Search
CPC .. H02J 17/00; H02J 50/70; H02J 50/40; H02J 50/50; H02J 1/102; H02J 7/00; H02J 7/0029; H02J 7/0063; H02J 50/15
See application file for complete search history.

(56) References Cited

U.S. PATENT DOCUMENTS

2015/0312986 A1  10/2015  Bell et al.
2016/0302268 A1  10/2016  Dunser

FOREIGN PATENT DOCUMENTS

| DE | 10 2013 224 749 | 6/2015 |
| DE | 10 2014 214 746 | 1/2016 |
| EP | 1257049 | 11/2002 |
| WO | 2014060899 | 4/2014 |

OTHER PUBLICATIONS

PCT search report in parent PCT application PCT/AT2016/050093 dated Sep. 21, 2016.

US 10,064,249 B2

CONVERTER FOR LIGHT SOURCES

CROSS REFERENCE TO RELATED APPLICATION

The present application is the U.S. national stage application of International Application PCT/AT 2016/050093, filed Apr. 13, 2016, which international application was published on Oct. 20, 2016 as International Publication WO 2016/164949 A1. The International Application claims priority to German Patent Application 10 2015 206 982.6 filed Apr. 17, 2015,and Austria Patent Application GM 201/2015 filed Jul. 7, 2015.

FIELD OF THE INVENTION

The invention relates to a converter for light sources for operating at least one light source, preferably at least one LED or LED strip. The invention also relates to a method for operating a converter for light sources. Furthermore, the invention relates to a converter for light sources having an LLC circuit, in which a (series) resonant circuit is powered by an alternating current voltage, which in turn serves to power a further converter step for powering a light source directly. The supply voltage supplied to the light source must then be typically converted to a DC voltage. Fundamentally, this can take place through a full bridge rectifier, for example. However, rectification by means of a transformer exhibits advantages from an energy perspective.

BACKGROUND OF THE INVENTION

A "converter for light sources" is an electrical circuit, which can be powered with an input voltage, and which can be connected to the light source, e.g. one or more LEDs, in order to thus be operated electrically in a defined manner.

WO 2014/060899 A2, by way of example, is known from the prior art, in which a converter for light sources is described in FIG. 1, which can serve as the starting point for the invention. A similar converter for light sources is also shown in FIG. 1 herein. A control circuit SE controls an inverter half bridge HB with two switches S1, S2 that are connected in series. As is illustrated in FIG. 1, the half bridge circuit HB is powered by an input voltage, which is depicted by way of example as a bus voltage $V_{Bus}$. Instead of a bus voltage, which is normally a DC voltage, i.e. a direct current voltage, a rectified alternating current voltage can also serve to power the half bridge.

Starting from a central point on the half bridge HB, or between the two switches S1, S2, respectively, a resonance circuit is then powered, formed in particular by a series connection of a capacitor C1, an inductor L1 and a second inductor L2a. Starting from the inductor L2a, a transformer T1 is then supplied with an alternating current voltage, i.e. an AC voltage. The transformer T1 contains the electromagnetic inductors, coils or windings L2a, L2b, L2c. The inductors L2b and L2c are disposed on the secondary side of the transformer T1. The inductors L2b and L2c are depicted as separate inductors, because a center tap is provided on the secondary side of the transformer T1.

Starting from the inductors L2b and L2c, a respective current path SP1 or SP2 is then powered. The current paths SP1 and SP2 thus each connect one side of the inductors L2b, L2c to a connecting point CP, wherein each current path has a diode for rectification.

The first current path SP1 has the diode D1, and the second current path SP2 has a second diode D2. An induced current $I_{SP1}$ is conducted via the first current path SP1, and an induced current $I_{SP2}$ is conducted via current path SP2. Moreover, an output connection E1 of the converter for light sources is connected to the connecting point CP, to which a load LED, e.g. a light source, and in particular at least one LED, can be connected.

Furthermore, a smoothing capacitor C2 is connected between the connecting point CP and the output connection E1 at its higher potential side, wherein the side of the second capacitor C2 with the lower potential can lie on the secondary side ground potential of the transformer.

The control circuit SE controls the higher potential switch S1 of the half bridge HB via a control signal HS ("high side" signal), and it controls the lower potential switch S2 of the half bridge with a signal LS ("low side" signal). The control circuit SE switches on the switches S1, S2, preferably configured as transistors, e.g. FET, MOSFET, in an alternating manner, in order to provide an alternating current voltage for the transformer Ti at the center of the half bridge HB.

In FIG. 1, the primary winding L2a of the transformer T1 is connected at its lower potential side to the primary side ground, as is likewise the case with the lower potential side of the half bridge switch S2. The current, or the voltage, flowing through the primary side inductor L2a is conducted through the transformer T1 to the secondary side, by means of which the current $I_{SP1}$ is induced in the first current path SP1, and the current $I_{SP2}$ is induced in the second current path SP2.

The center tap between the secondary side inductors L2b and L2c provides currents or voltages at the connecting point CP, which lie substantially symmetrically on either side of a zero point.

A direct current, or a direct current voltage, is provided at the connecting point CP via the diodes D1 and D2, in order to operate the load LED. The secondary side ground can either be connected to the primary side ground or it can be insulated therefrom.

On the whole, the voltage, or the current $I_{SP1}$ or $I_{SP2}$ at the output E1 depends on the voltage, or the waveform of the voltage, at the primary side inductor of the transformer T1. These can be adjusted by changing a timing or switching frequency of the switches S1, S2, or a duty cycle of the half bridge circuit HB, i.e. in particular through a change in the on-time of the switches S1, S2.

Starting from the circuit shown in FIG. 1, there is the problem that the inductances L2b, L2c on the secondary side of the transformer T1 (which represent, in particular, two halves of a single secondary side inductor) are not precisely symmetrical, and do not have the same electrical or symmetrical parameters. This leads to an asymmetrical load to the downstream components on the secondary side of the transformer T1, and in particular the diodes D1 and D2. As a result, it is possible that only one of the current paths SP1, SP2, and thus one diodes D1/D2, is charged.

SUMMARY OF THE INVENTION

The invention provides a solution that allows an exact symmetry of the currents output at the secondary side to be obtained, i.e. the at the connecting point CP, or at the output E1, even with unequal or asymmetrical inductances L2b, L2c on the secondary side of the transformer T1.

In a first aspect, a light source converter having an LLC resonance circuit is provided, wherein light sources, e.g. an LED strip, can be powered from its secondary side, and the LLC resonance circuit includes a half bridge circuit with two switches connected in series, which are activated by a control circuit. A resonance circuit is powered from a central point between the two switches, and a transformer is supplied with AC voltage from an output of the resonance circuit, on the secondary side of which a separate current path is provided for each of the two polarities of the AC voltage. A detection circuit is provided that detects a signal representing currents in the two current paths and/or the ratio between the two currents, and the control circuit adjusts the timing of the two switches of the half bridge circuit as a function of the signal detected by the detection circuit.

The detection circuit can have at least one detection branch, which detects the signal representing the current through at least one signal path.

The at least one detection branch can evaluate a rectified mixed signal.

The at least one detection branch can include a sample and hold circuit.

The detection circuit can include a detection branch for each current path.

The at least one detection branch can include a switch, the timing of which is synchronized to one of the two switches of the half bridge circuit.

A voltage and/or a voltage value can be detected at the at least one detection branch, which is proportional to the current through one of the current paths.

The control circuit can change a duty cycle of the half bridge circuit as a function of the signal supplied to the control circuit, and in particular, it can shorten or lengthen an on-time of at least one of the two switches of the half bridge circuit.

The secondary side of the transformer can include a winding having a center tap coupled to a primary side winding of the transformer, from which the current paths are powered.

Each current path can have a detection inductor, each of which is electromagnetically coupled to at least one third detection inductor of the detection circuit. The at least one detection branch of the detection circuit can be disposed between a rectifier and a filter circuit.

The control circuit can change the activation of the two switches of the half bridge circuit by changing the timing until the signal supplied to the control circuit corresponds to a target value and/or the signals supplied to the control circuit are substantially identical, e.g. having equal signal values.

The control circuit can change the activation of the two switches of the half bridge circuit by changing the timing until a target value for a signal supplied to the control circuit has been reached, which represents, in particular, a ratio of two voltage values.

The detection circuit can include two detection branches, the switches of which are each timed such that they are synchronized to one of the two respective switches of the half bridge circuit.

The detection circuit can send two signals to the control circuit, each of which displays an electrical parameter representing a current through a current path, and/or forms a ratio between the two signals, and transmits data regarding the ratio to the control unit.

In a further aspect, a method is provided for making the current flows at the output of an LLC resonance circuit symmetrical, the secondary side of which, light sources can be powered, e.g. an LED strip. In the LLC resonance circuit, a control circuit activates two switches of a half bridge circuit connected in series. The half bridge circuit powers a resonance circuit from a central point between the two switches. Output from the resonance circuit supplies an AC voltage to a transformer, on the secondary side of which a separate current path is provided for each of two polarities of the AC voltage. A detection circuit detects a signal representing the currents in the two current paths and/or the ratio between them, and the control circuit adjusts the timing of the two switches of the half bridge circuit as a function of the signal detected by the detection circuit.

BRIEF DESCRIPTION OF THE DRAWINGS

The invention shall now be described with reference to the Figures. Therein.

DETAILED DESCRIPTION

Figure 2:
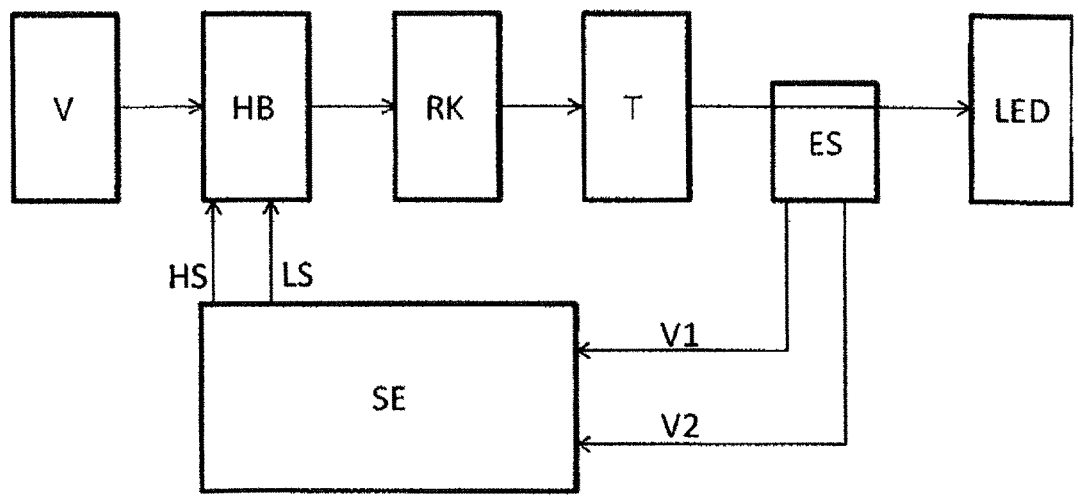
FIG. 2 shows, schematically, a circuit assembly according to the invention.

FIG. 2 shows, schematically, a circuit according to the invention. Starting from a power source V, in particular a direct current voltage or a rectified alternating current voltage, e.g. a rectified supply voltage, a half bridge circuit HB is powered, which powers a resonance circuit RK with an alternating current voltage.

Figure 1:
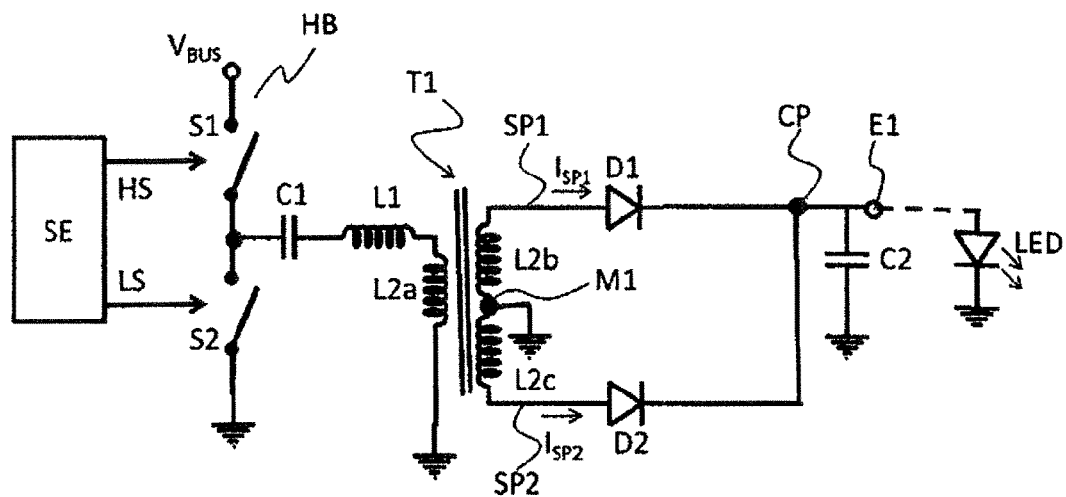
FIG. 1 shows a circuit assembly according to the prior art.

The half bridge preferably includes, as is described in reference to FIG. 1, at least two switches S1 and S2 connected in series, which are activated by a control unit SE. The higher potential switch can be activated via the activation signal HS, and the lower potential switch can be activated via the activation signal LS.

The primary side winding of the transformer Ti is connected to the resonance circuit RK. A least one current path is powered by the secondary side winding of the transformer T, having a center tap, which basically divides the secondary side inductor into two inductors. A detection circuit ES is integrated in this current path, which detects at least one signal representing the current in the at least one current path, preferably the currents in two current paths, or their ratio. A datum representing the signal or signals, or ratio, is then sent to the control circuit SE, which changes a duty cycle thereof, or a timing of the switch of the inverter HB, by modifying the activation signals HS and/or LS.

Signals V1 and V2 are depicted in FIG. 2, which are sent from the detection circuit ES to the control circuit SE. It is understood thereby that if only one signal representing the ratio of the current values, or just one signal, is sent to the control unit SE, only this signal must be supplied by the detection circuit ES to the control circuit SE. The load LED can be powered electrically by the transformer T.

Details of the circuit according to the invention shall now be explained in reference to FIGS. 3a and 3b.

A circuit substantially corresponding to that in FIG. 1 is shown in FIG. 3A. Identical reference symbols from FIG. 1 correspond to substantially identical components of the circuit in FIG. 3a. The electrical power V is thus depicted in FIG. 3a as the voltage $V_{Bus}$. The substantial difference is that here, a first detection inductor L3a is connected in the first current path SP1, between the diode D1 and the connecting point CP. Furthermore, a second detection inductor L3b is provided in the second current path SP2 between the diode D2 and the connecting point CP. A third detection inductor L3c is electromagnetically coupled to the first and second detection inductors L3a and L3b, which is preferably on the primary side of the resonance circuit RK, or the LLC resonance circuit, or the transformer T1.

The first detection inductor L3a and the second detection inductor L3b, together with the third detection inductor L3c, form the converter W1, and in particular, a further transformer. A current that is a function of the current through the first detection winding L3a is thus detected at the third detection winding L3c when a current $I_{SP1}$ flows through the first current path SP1, while a current that is a function of the current $I_{SP2}$ through the second current path SP2 is detected when the current $I_{SP2}$ flows through the second current path SP2. Thus, for each polarity of the primary side AC voltage, a separate current path is provided on the secondary side for the induced currents.

The current detected at the third detection winding L3c is then supplied to a rectifier, which then outputs a rectified current $I_{sense}$. According to the invention, the current signal $I_{sense}$ is then evaluated with regard to an asymmetry of the current portions through the current paths SP1, SP2, or through the diodes D1, D2.

As is shown in FIG. 3b, the current signal $I_{sense}$ is sent from the rectifier to a known filter circuit FS, composed of a resistance filter RF, a capacitance filter CF, and a sampling resistor $R_{sens}$, and averaged, such that ultimately the average $I_{sense\_avg}$ of the current flowing on the secondary side of the transformer T1 can be evaluated as a representative signal for regulating the LED current. The average signal $I_{sense\_avg}$ is then used for regulating the current, wherein it is used as an actual-value signal, and can be used as a correcting variable for the timing of the switches S1, S2 of the inverter HB. Accordingly, the average signal $I_{sense\_avg}$ is sent to the control circuit as signal (3).

It is then provided, according to the invention, that prior to the averaging, the combined current signal $I_{sense}$ is divided into values that are representative of the current through the current paths SP1 and SP2, or the currents at the diodes D1 and D2. A first detection branch EZ1 is provided for this, composed of a series connection comprising a third switch S3, which is connected at its higher potential side to the rectifier GR as well as the resistance filter RF, and a first resistor RH1 as well as a first capacitor CH1 are formed. A voltage signal V1 is detected between the first resistor RH1 and the first capacitor CH1, representing the voltage dropping over the first capacitor CH1.

A second detection branch EZ2 composed of a series connection of a fourth switch S4, a second resistor RH2 and a second capacitor CH2 is likewise connected between the rectifier GR and the filter circuit. The higher potential connection of the fourth switch S4 is connected to the rectifier GR as well as the resistance filter $R_F$, while its lower potential side is connected to the one side of the second resistor RH2. The second capacitor CH2 is connected to the other side of the second resistor RH2, which is connected at the other side to a ground. The measurement signal V2 is detected between the second resistor RH2 and the second capacitor CH2, representing a voltage dropping over the second capacitor CH2.

When the third switch S3 is on, the current 12 flows in the first detection branch EZ1, and when the fourth switch S4 is on, the current 12 flows in the second detection branch EZ2.

The only thing that is decisive is that the activation of the third switch S3 and the fourth switch S4 is synchronized with the activation of the switches S1, S2 of the half bridge HB. By way of example, the activation of the third switch S3 is synchronized to the activation of the higher potential switch 5 1 of the half bridge, while the activation of the fourth switch S4 is synchronized to the activation of the lower potential switch S2 of the half bridge HB. Accordingly, the third switch S3 is activated with the activation signal HS from the control circuit SE, while the fourth switch S4 is activated with the activation signal LS, or vice versa.

A fundamental concept of the invention is that the currents through the diodes D1 and D2 can be evaluated separately. In the present case, a dividing of the current signal $L_{sense}$ takes place subsequently, because the combination of the two currents $I_{SP2}$ and $I_{SP1}$ is already provided for the averaging.

Alternatively, a third or fourth detection inductor separately coupled to the first detection inductor L3a and to the second detection inductor L3b could also be provided for evaluation. A corresponding voltage or current signal could also then be transmitted to the control circuit SE. Furthermore, it can be provided that the detection circuit ES determines a ratio from the detection signals V1 and V2, and transmits this as a single signal to the control circuit SE. For this, an appropriate circuit for obtaining the ratio value can be provided in the detection circuit.

With knowledge of the at least one signal, sent from the detection circuit ES to the control circuit SE, and representing the current through the diodes D1 or D2, an asymmetry of the secondary side inductors L2b, L2c of the transformer T1 can be eliminated, not in a mechanical manner, but in a manner involving regulation technology, in that in the path of a return regulation for this asymmetry, the returned value is used for changing the timing of the half bridge switches S1, S2 and in particular for changing the duty cycle of the half bridge HB.

Figure 3:
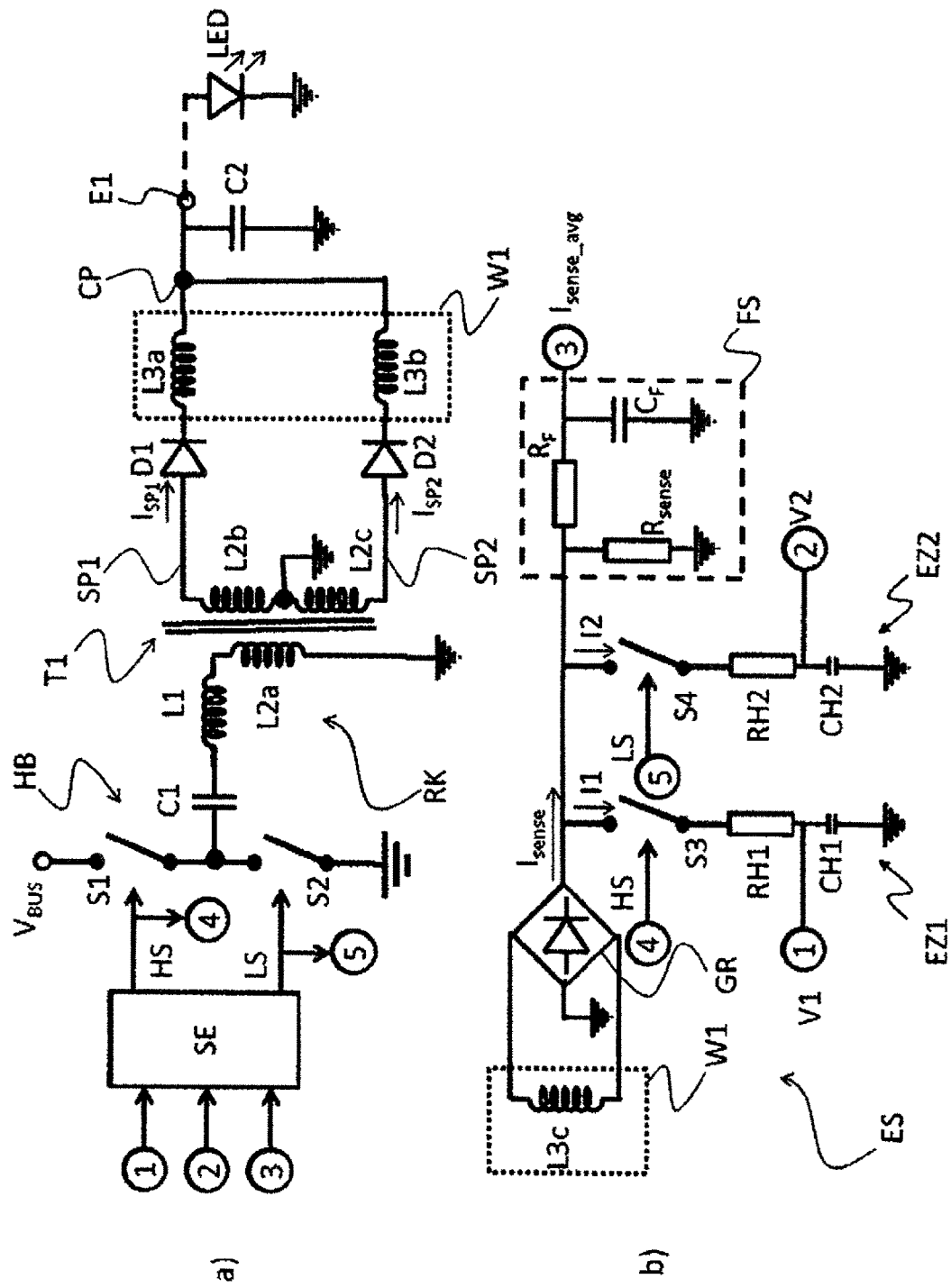
FIG. 3 shows, by way of example, a circuit assembly according to the invention.

In the exemplary embodiment shown in FIG. 3, the detection signals V1 and V2, which correspond to voltage signals representing the current through the diodes D1 or D2, which are evaluated by the control circuit SE (in particular IC, ASIC, microcontroller), then activate the switches S1, S2 of the half bridge HB accordingly. It can furthermore be provided that the detection circuit ES has its own microcontroller, ASIC or IC, which sends the return signal to a further control unit, at which point this control unit then changes the activation of the inverter switches S1, S2.

The resonance circuit, or LLC resonance circuit, is used with the transformer T1 having a center point tap in order to obtain a somewhat higher efficiency. The problem solved by the invention thus addresses the fact that, independently of the operating point, the currents through the secondary windings L2b, L2c may differ. In particular, the invention prevents the entire output current of the transformer T1 from flowing over just one current path SP1, SP2, i.e. over one of the secondary side inductors L2b, L2c, which also represents a significant electrical as well as thermal load to the transformer T1. While the half bridge typically functions with a duty cycle of 50%, i.e. such that the switches S1, S2 of the half bridge are substantially active to the same extent, possibly taking into account down time, the solution according to the invention compensates for any asymmetry by correcting the duty cycle of the half bridge HB, and in particular, by modifying an on-time and/or off-time of the half bridge switches S1, S2.

Figure 4:
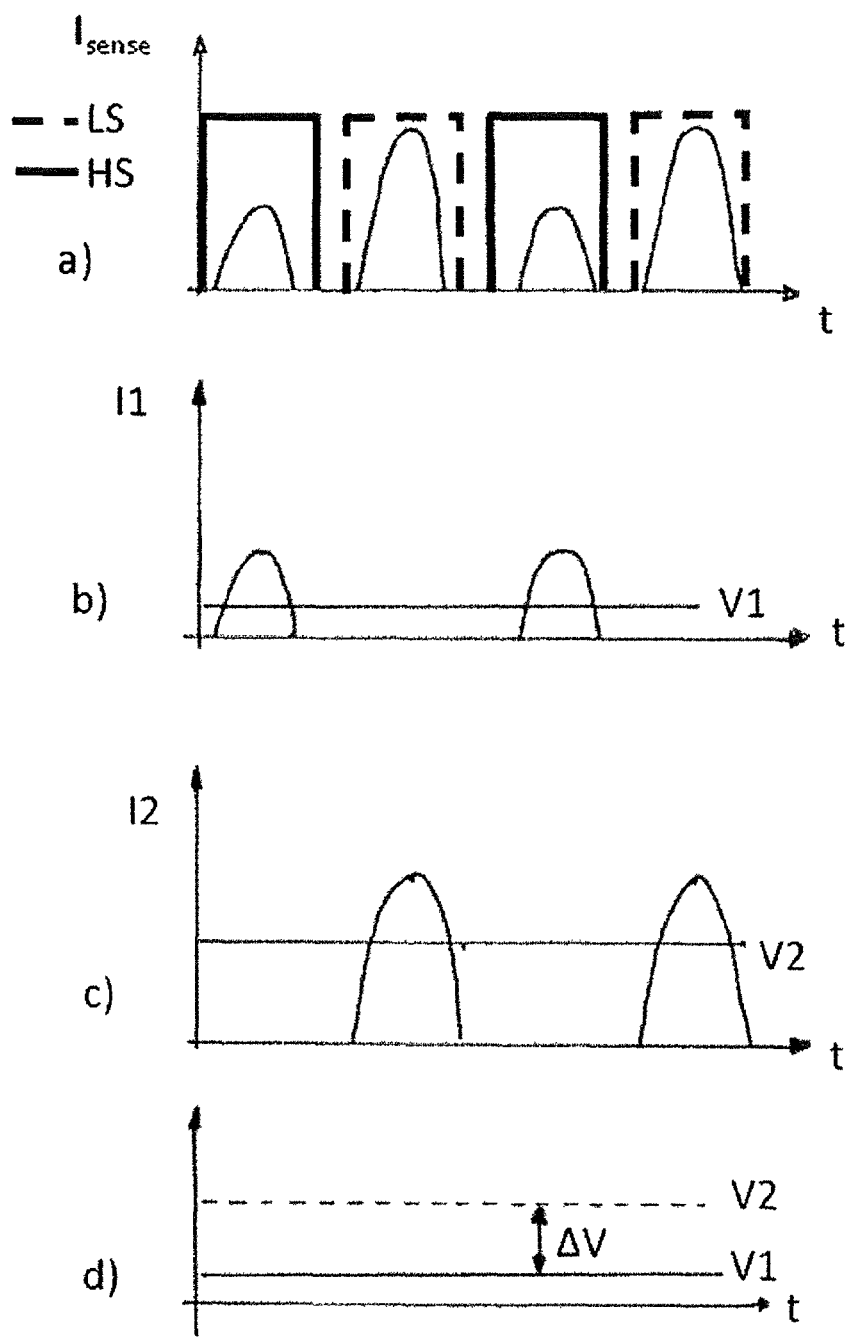
FIG. 4 shows, by way of example, detection values.

FIGS. 4a-c show, schematically, how different currents can be present in the current paths SP1, SP2 when there is an asymmetry occurring with substantially equal activations of the half bridge switches S1, S2 by the activation signals LS and HS.

While the detection circuit ES determines the detection signal V1 at the first detection branch EZ1 when the switch Si and the third switch S3 are activated by means of the signal HS, as is shown in FIGS. 4a and 4b, the second detection branch EZ2 determines the detection signal V2 when the switch S2 and the fourth switch S4 are activated by means of the signal LS.

Accordingly, there is a deviation ΔV between the detection signals V1 and V2, as is shown in FIG. 4d, which reflects the asymmetry. Accordingly, by changing the activation of the half bridge switches S1, S2 by modifying the activation signals LS, HS, a change in the currents $I_{SP1}$, $I_{SP2}$ can be generated in the current paths SP1, SP2. In particular, the value ΔV can be used as an actual value for the asymmetry, which can then be used by the control circuit SE, which is responsible for activating the half bridge switches S1, S2.

The current of the secondary inductors L2b, L2c of the transformer T1 is thus detected via the detection inductors L3a to L3c. As is shown in FIG. 3b, this alternating current signal is rectified by means of a rectifier GR, in particular a bridge rectifier. The signals V1, V2 are then obtained through the timing of the switches of the detection branches EZ1, EZ2, as is shown in FIGS. 4b and 4c. The current in the inductors L3a to L3c behaves in a synchronized manner for switching the half bridge switches S1, S2, which are activated via the control signals LS and HS.

It should be noted thereby that the first resistor RH1 and the first capacitor CH1 form a sample and hold circuit. The same applies to the second resistor RH2 and the second capacitor CH2. Thus, the measurement signal detected via the third and fourth switches S3, S4 is sent, in each case, to a sample and hold step. As a result, the detection signal V1 is obtained, thus the voltage V1 at the detection point (1), while the detection signal V2, or the voltage signal, is obtained at the detection point (2), wherein the signal at point (1) is proportional to the current through the first detection inductor L3a, while the detection signal V2 is proportional to the current through the second detection inductor L3b.

The detection signals can then be evaluated, for example, with the analog/digital converter of a microcontroller, which then changes the duty cycle of the inverter HB until the detection signal V11 at point (1) corresponds to the detection signal V2 at point (2).

What is claimed is:

1. An LED light source converter having an LLC resonance circuit, by means of which light sources can be powered from the secondary side thereof, wherein the light source converter comprises:
   a half bridge circuit (HB) having two switches (S1, S2) connected in series, which are activated by a control circuit (SE):
   a resonance circuit (RK) powered from a center point between the two switches (S1, S2);
   a transformer (T1) supplied with AC voltage from an output of the resonance circuit (RK), having a separate current path (SP1, SP2) for each of the two polarities of the AC voltage provided to a connection point (CP) on its secondary side;
   a detection circuit (ES) that detects at least one signal (V1, V2) representing the currents ($I_{sp1}$, $I_{sp2}$) in the two separate current paths (SP1, SP2) and/or the ratio thereof;
   wherein the control circuit (SE) adjusts the timing of the two switches (S1, S2) of the half bridge circuit (HB) as a function of the at least one signal (V1, V2) representing the currents or ratio thereof detected by the detection circuit (ES).

2. The light source converter according to claim 1, wherein the detection circuit (ES) has a first detection branch (EZ1), which detects the signal representing the current through one of the respective current paths (SP1), and a second detection branch (EZ2), which detects the signal representing the current through the other respective current path (SP2).

3. The light source converter according to claim 2, wherein the first detection branch (EZ1) evaluates a rectified signal ($I_{sense}$), and contains a sample and hold circuit (S3, RH1, CHI), and the second detection branch (EZ2) evaluates a rectified signal ($I_{sense}$) and contains a sample and hold circuit (S4, RH2, CH2).

4. The light source converter according to claim 1 wherein the detection circuit (ES) has a detection branch (EZ1, EZ2) for each current path (SP1, SP2).

5. The light source converter according to claim 2 wherein the first detection branch (EZ1) has a switch (S3) the timing of which is synchronized to one of the switches (S1, S2) of the half bridge circuit (HB), and the second detection branch (EZ2) has a switch (S4), the timing of which is synchronized to the other switch (S1, S2) of the half bridge circuit (HB).

6. The light source converter according to claim 1 wherein the control circuit (SE) changes a pulse duty factor of the half bridge circuit (HB) as a function of the at least one signal (V1, V2) sent to the control circuit (SE), by shortening or lengthening an on-time of at least one of the two switches (S1, S2) of the half bridge (HB), until the at least one signal (V1, V2) sent to the control circuit (SE) corresponds to a target value or if there are two signals (V1, V2) sent to the control circuit, both signals have the same signal values, or a a ratio between the two signal values corresponds to a target value.

7. The light source converter according to claim 1 wherein each separate current path (SP1, SP2) has a detection inductor (L3a, L3b), which is electromagnetically coupled to at least one third detection inductor (L3c) of the detection circuit (ES).

8. The light source converter according to claim 2 wherein the signal from the third detection inductor (L3c) is provided to a rectifier (GR) in the detection circuit, and the first and second detection branches (EZ1, EZ2) of the detection circuit (ES) are disposed between the rectifier (GR) and a filter circuit (FS).

9. The light source converter according to claim 1 wherein the detection circuit (ES) has two detection branches (EZ1, EZ2), the switches (S3, S4) of which are timed such that they are synchronized to one of the respective switches (S1, S2) of the half bridge circuit (HB), and the detection circuit (ES) sends two signals (V1, V2) to the control circuit (SE), each of which displays an electrical parameter representing a current ($I_{sp1}$, $I_{sp2}$) through a current path (SP1, SP2), and/or forms a ratio between the two signals (V1, V2) and conveys data regarding the ratio to the control unit (SE).

10. A method for bringing the current flows at the output of an LCC resonance circuit into symmetry, at the secondary side of which, light sources can be powered, the method comprising the steps of:
   using a control circuit (SE) to activate two switches (S1, S2) of a half bridge circuit (HB), connected in series;
   powering a resonance circuit (RK) from a central point between the two switches (S1, S2) of the half bridge circuit (HB);
   starting from an output of the resonance circuit (RK), supplying an AC voltage to a transformer (T1), on the secondary side of which a separate current path (SP1, SP2) is provided to a connection point (CP) for each of the two polarities of the AC voltage;

using a detection circuit (ES) to detect at least one signal (V1, V2) representing the current ($I_{sp1}$, $I_{sp2}$) of the two separate current paths (SP1, SP2) and/or the ratio thereof; and using the control circuit (SE) to adjust the timing of the two switches (S1, S2) of the half bridge circuit (HB) as a function of the at least one signal (V1, V2) representing the currents or ratio thereof detected by the detection circuit (ES).

11. The light source converter according to claim 2 wherein first detection branch (EZ1) detects a voltage and/or a voltage value, which is proportional to the current through said one of the respective current paths (SP1); and the second detection branch (EZ2) detects a voltage and/or a voltage value, which is proportional to the current through said another respective current path (SP2).

* * * * *